United States Patent
Cheng (10) Patent No.: US 7,283,680 B2
(45) Date of Patent: Oct. 16, 2007

(54) METHOD FOR IMAGE PROCESSING BY UNSHARP MASKING

(75) Inventor: Tzu-Hung Cheng, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 869 days.

(21) Appl. No.: 10/605,250

(22) Filed: Sep. 17, 2003

(65) Prior Publication Data
US 2005/0008249 A1    Jan. 13, 2005

(30) Foreign Application Priority Data
Jul. 7, 2003    (CN) ................. 03 1 45390

(51) Int. Cl.
*G06K 9/40* (2006.01)
*H04N 5/21* (2006.01)
(52) U.S. Cl. .................. 382/260; 382/266; 348/625
(58) Field of Classification Search ................ 382/132, 382/260, 263, 264, 266; 348/625
See application file for complete search history.

(56) References Cited

U.S. PATENT DOCUMENTS

| | | | | |
|---|---|---|---|---|
| 5,038,388 A | * | 8/1991 | Song | 382/266 |
| 5,189,511 A | * | 2/1993 | Parulski et al. | 358/518 |
| 5,231,677 A | * | 7/1993 | Mita et al. | 382/266 |
| 5,428,456 A | * | 6/1995 | Parulski et al. | 386/124 |
| 5,805,721 A | * | 9/1998 | Vuylsteke et al. | 382/128 |
| 5,880,767 A | * | 3/1999 | Liu | 347/251 |
| 5,912,715 A | * | 6/1999 | Hanai | 348/626 |
| 6,005,983 A | * | 12/1999 | Anderson et al. | 382/254 |
| 6,411,305 B1 | * | 6/2002 | Chui | 345/660 |
| 6,614,944 B1 | * | 9/2003 | Levantovsky | 382/261 |
| 6,628,842 B1 | * | 9/2003 | Nagao | 382/266 |
| 6,697,540 B1 | * | 2/2004 | Chen | 382/300 |
| 6,788,824 B1 | * | 9/2004 | Prestia | 382/263 |
| 6,965,702 B2 | * | 11/2005 | Gallagher | 382/266 |
| 6,993,203 B2 | * | 1/2006 | Ozawa et al. | 382/257 |
| 2004/0176062 A1 | * | 9/2004 | Hsieh | 455/221 |
| 2006/0039622 A1 | * | 2/2006 | Casale et al. | 382/266 |
| 2007/0009145 A1 | * | 1/2007 | Winsor et al. | 382/132 |

\* cited by examiner

*Primary Examiner*—Jingge Wu
*Assistant Examiner*—Jeffrey S Smith
(74) *Attorney, Agent, or Firm*—Winston Hsu (57) ABSTRACT

A method for adjusting an image signal by a processor includes providing a first low pass filter and a second low pass filter, generating an energy ratio of a band-pass image signal and the image signal according to the standard deviation of a first low pass signal of the first low pass filter and a second low pass signal of the second low pass filter, providing an image adjustment parameter and generating a weighting coefficient of the image signal according to the energy ratio and the image adjustment parameter, generating a third low pass filter according to the weighting coefficient of the image signal, the image adjustment parameter, the first low pass signal of the first low pass filter and the second low pass signal of the second low pass filter, and adjusting the image signal according to the image signal and the third low pass filter.

20 Claims, 7 Drawing Sheets

METHOD FOR IMAGE PROCESSING BY UNSHARP MASKING

BACKGROUND OF INVENTION

1. Field of the Invention

The present invention relates to a method for adjusting an image signal by a processor, and more specifically, to a method for image processing by unsharp masking.

2. Description of the Prior Art

Figure 1:
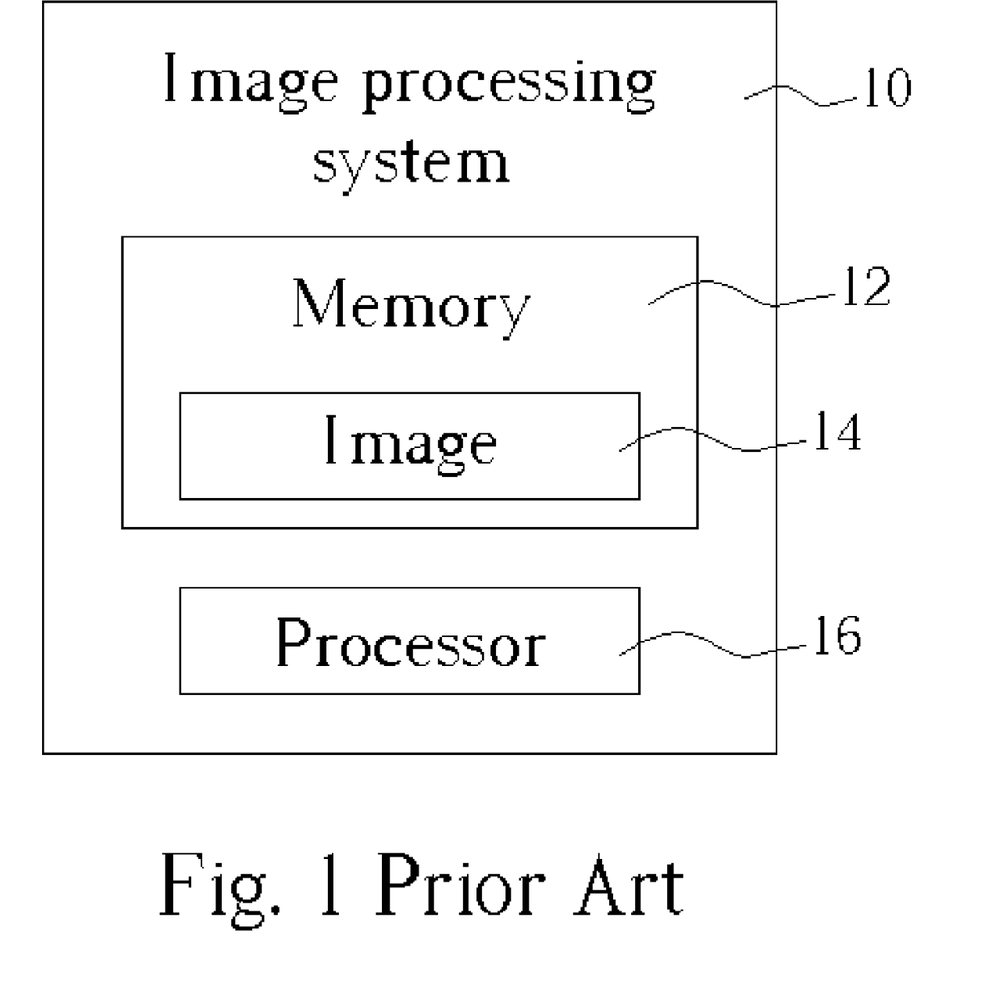
FIG. 1 is a block diagram illustrating a conventional image processing system.
Figure 2:
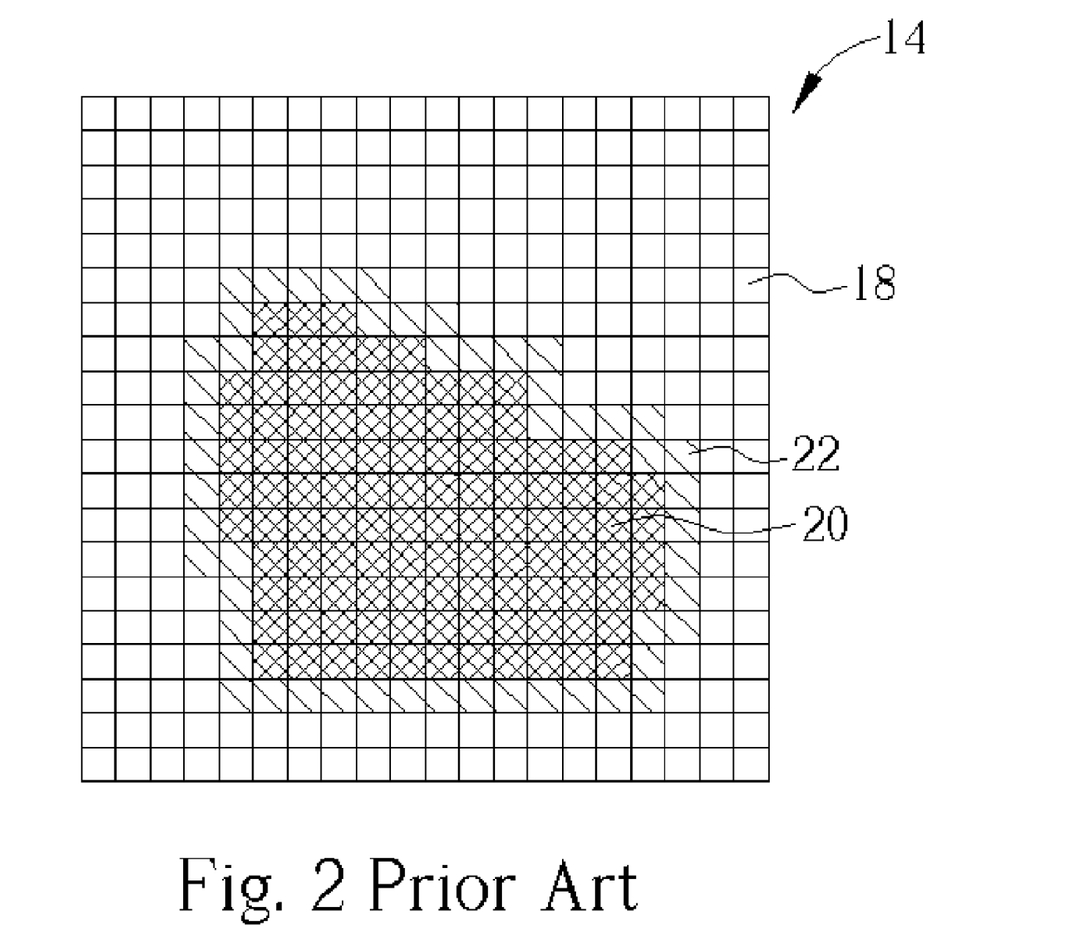
FIG. 2 illustrates an image of the image processing system in FIG. 1.

Please refer to FIG. 1 and FIG. 2. FIG. 1 is a block diagram illustrating a conventional image processing system 10 and FIG. 2 illustrates an image 14 of the image processing system 10 in FIG. 1. The image processing system 10 includes a memory 12 for storing programs and the image 14 to be processed, and a processor 16 for executing the programs stored in the memory 12. The image 14 includes a plurality of pixels 18 arranged in matrix form. The image 14 is composed of an image area 20 with specific features and a boundary area 22 around the image area 20.

A goal of image processing is to have the features of the image area 20 stand out while keeping the image area 20 and the surrounding edge area 22 in harmony. An adjustment of the image parameters of the whole image 14 will sacrifice some features that are not within the image area 20 or cause distortion of the image area 20. For this reason, some image processing methods adjust only the image parameters of the surrounding edge area 22 in order to emphasize the high frequency characteristic of the edge of the image.

The unsharp mask method is a method based on the concept mentioned above. According to the method, first unsharpen an image to obtain a low frequency element of the image, then subtract the unsharpened image from the original image to obtain a high frequency element of the original image. Apply a convolution operation to the remaining high frequency image and eventually add the subtracted low frequency image to the remaining high frequency image to complete the process. Although the unsharp mask method can sharpen the edge of the image, it also increases the high frequency element of the image and raises the luminance of the whole image, making it lighter. In addition, according to the conventional unsharp mask method, while applying the convolution operation to the high frequency image and adding back the subtracted low frequency image, because two operation intensive calculations are required to be processed simultaneously, processing time and image processing cost are increased.

SUMMARY OF INVENTION

It is therefore a primary object of the present invention to provide a method for adjusting an image signal by a processor to solve the problem mentioned above.

Briefly summarized, a method for adjusting an image signal by a processor includes providing a first low pass filter and a second low pass filter; generating an energy ratio of a band-pass image signal and the image signal according to the standard deviation of the low pass signal of the first low pass filter and the low pass signal of the second low pass filter; providing an image adjustment parameter and generating a weighting coefficient of the image signal according to the energy ratio and the image adjustment parameter; generating a third low pass filter according to the weighting coefficient of the image signal, the image adjustment parameter, the low pass signal of the first low pass filter, and the low pass signal of the second low pass filter; and adjusting the image signal according to the image signal and the third low pass filter.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
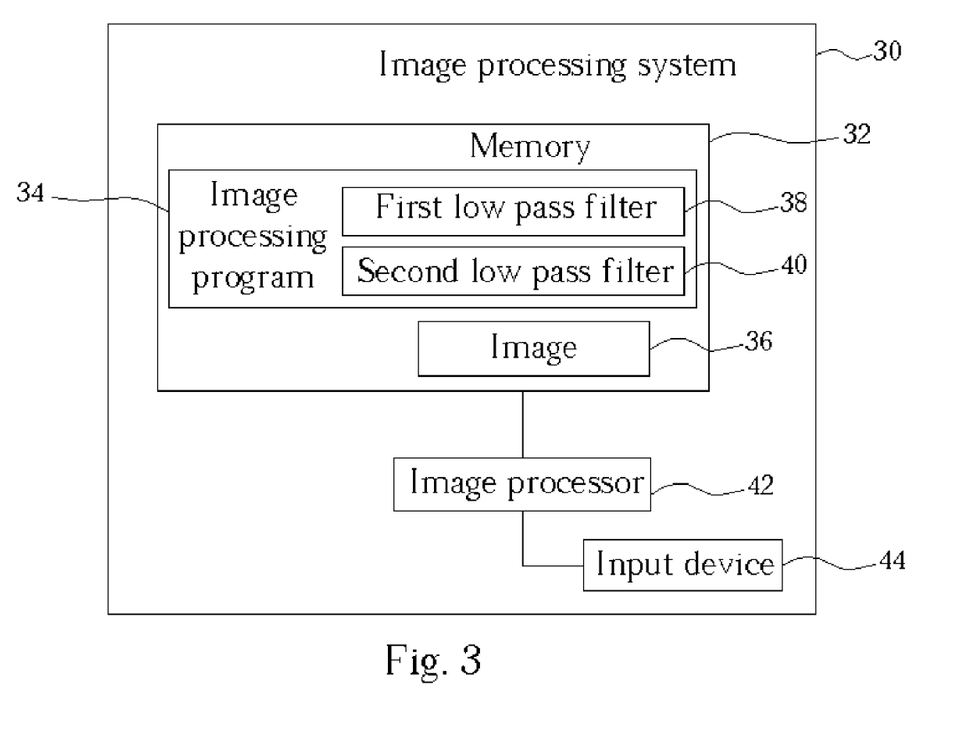
FIG. 3 is a block diagram illustrating an image processing system according to the present invention.

Please refer to FIG. 3. FIG. 3 is a block diagram illustrating an image processing system 30 according to the present invention. The image processing system 30 includes a memory 32 for storing an image processing program 34 and an image 36 to be processed. The image processing program 34 includes a first low pass filter 38 and a second low pass filter 40 implemented using software. The first low pass filter 38 and the second low pass filter 40 can also be hardware circuits. The image processing system 30 further includes an image processor 42 for executing the image processing program 34 stored in the memory 32, and an input device 44 for image parameter settings.

Figure 4:
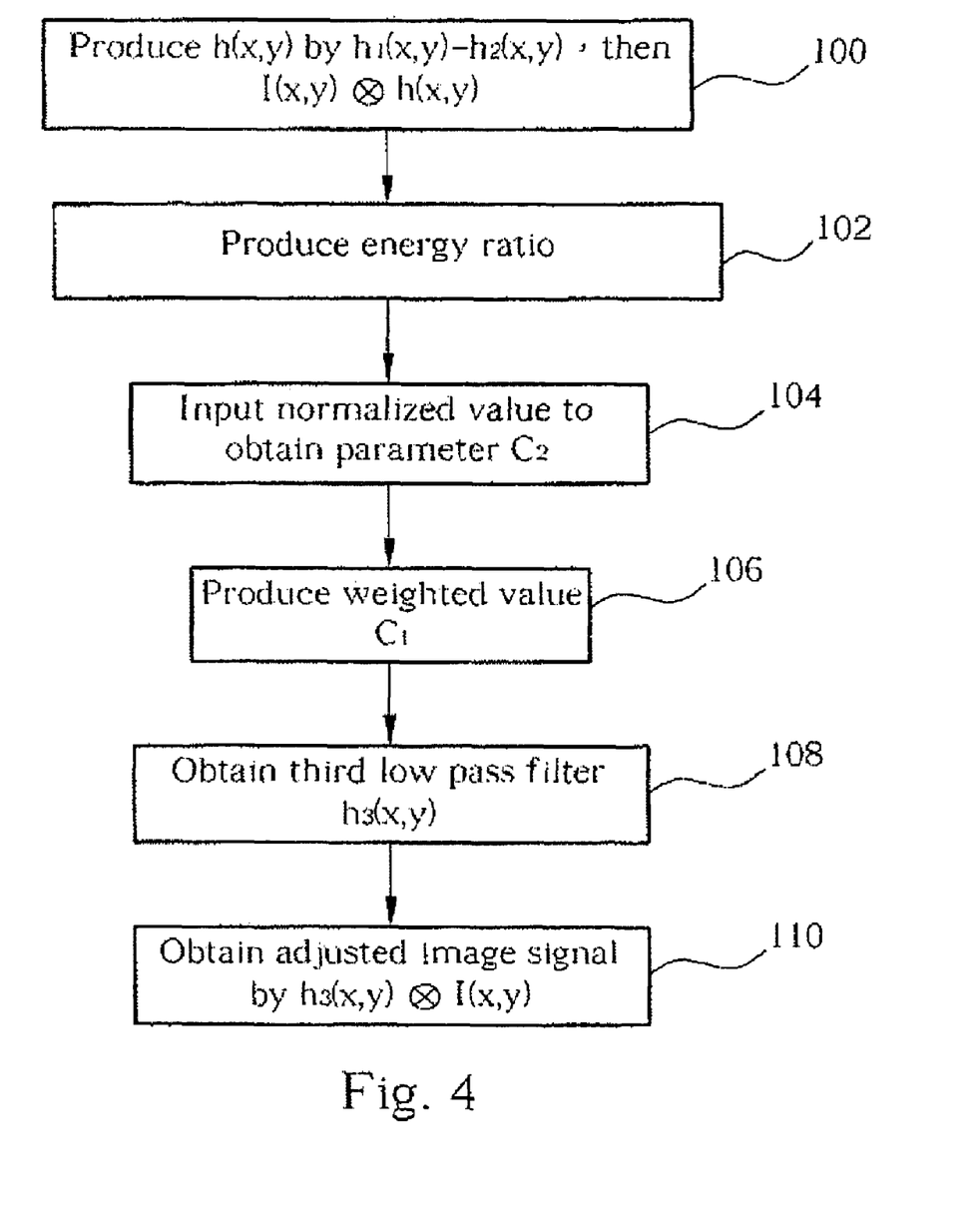
FIG. 4 illustrates a flowchart of image processing by the image processing system according to the present invention.
Figure 5:
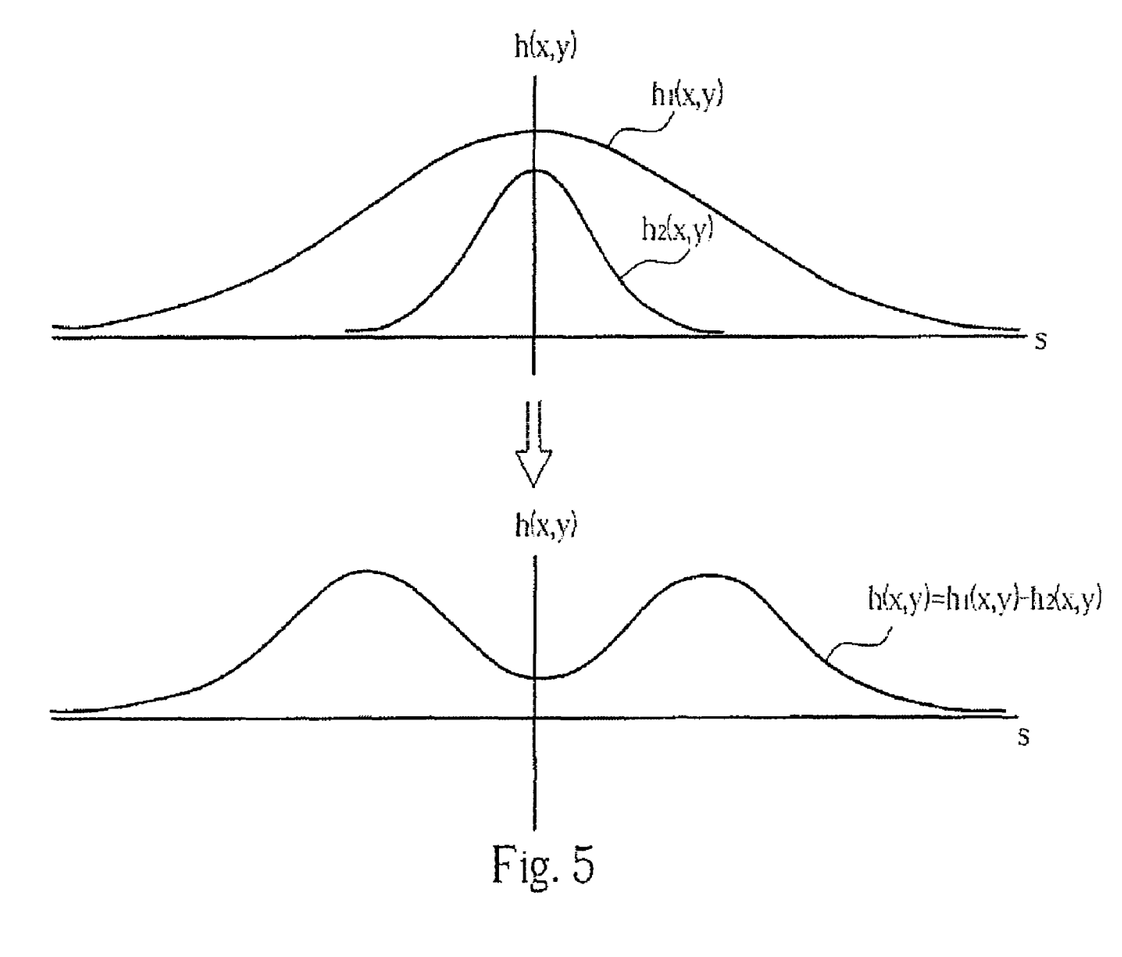
FIG. 5 illustrates a subtraction between a low pass filter signal $h_1(x, y)$ of the first low pass filter and a low pass filter signal $h_2(x, y)$ of the second low pass filter in frequency domain.

Please refer to FIG. 4 showing a flowchart for image processing by the image processing system 30 according to the present invention. The flowchart in FIG. 4 includes following steps:

Step 100: Please refer to FIG. 5 showing a subtraction between a low pass filter signal $h_1(x, y)$ of the first low pass filter 38 and a low pass filter signal $h_2(x, y)$ of the second low pass filter 40, shown in frequency domain. Obtain a band-pass filter signal $h(x, y)$ by subtracting the low pass filter signal $h_2(x, y)$ of the second low pass filter 40 from the low pass filter signal $h_1(x, y)$ of the first low pass filter 38. Define the signal resulting from convoluting the band-pass filter signal $h(x, y)$ and an image signal $I(x, y)$ as a band-pass image signal $h(x, y) \otimes I(x, y)$, wherein $\otimes$ means convolution.

Step 102: Generate an energy ratio $$\frac{E_{h \otimes I}}{E_I}$$

of the band-pass image signal and the image signal according to the standard deviation of the low pass filter signal $h_1(x, y)$ of the first low pass filter 38 and the low pass filter signal $h_2(x, y)$ of the second low pass filter 40. The energy ratio $$\frac{E_{h \otimes I}}{E_I}$$

of the band-pass image signal $h(x, y) \otimes I(x, y)$ and the image signal $I(x, y)$ is equivalent to $$\frac{1}{4\pi\sigma_1^2} - \frac{2}{2\pi(\sigma_1^2 + \sigma_2^2)} + \frac{1}{4\pi\sigma_2^2}$$

wherein $\sigma_1$ is not equivalent to $\sigma_2$.

Step 104: Provide a maximum image distortion ratio and divide it with the energy ratio $$\frac{E_{h\Theta I}}{E_I}$$

to obtain a maximum image adjustment weighting coefficient $C_2|_{max}$. Further provide an image adjustment normalized value between 0 and 1 so that an image adjustment parameter $C_2$ can be obtained by multiplying the maximum image adjustment weighting coefficient $C_2|_{max}$ with the image adjustment normalized value. A user can input the image adjustment normalized value by the input device 44 of the image processing system 30 to obtain the image adjustment parameter $C_2$.

Step 106: Generate a weighting coefficient $C_1$ of the image signal according to the energy ratio $$\frac{E_{h\Theta I}}{E_I}$$

and the image adjustment parameter $C_2$, wherein $$C_1 = 1 - C_2 \frac{E_{h\Theta I}}{E_I}.$$

Step 108: Obtain a third low pass filter 41 $h_2(x, y)$ according to the weighting coefficient $C_1$ of the image signal, the image adjustment parameter $C_2$, the low pass filter signal $h_1(x, y)$ of the first low pass filter 38, and the low pass filter signal $h_2(x, y)$ of the second low pass filter 40, wherein $h_2(x, y) = C_1 \delta(x, y) + C_2[h_1(x, y) - h_2(x, y)]$, and $\delta(x, y)$ is a delta function.

Step 110: Finally, convolute the third low pass filter 41 $h_1(x, y)$ with the image signal $I(x, y)$ to obtain an adjusted image signal $f_1(x, y) = h_3(x, y) \otimes I(x, y)$, wherein $\otimes$ means convolution.

The image processing method according to the first embodiment of the present invention includes capturing the high frequency portion of the image 36 and applying a convolution operation, i.e. $C_2[h(x, y) \otimes I(x, y)]$. Then adding the weighting coefficient of the original signal, i.e. $C_1 I(x, y)$, so that the high frequency portion can be emphasized.

Further imposing a restriction according to conservation of energy, i.e. $(E_{f_1} = C_1 E_I + C_2 E_{h \otimes I})^\wedge (E_{f_1} = E_I)$, and calculating an adjusted image signal $f_1(x, y)$ under the condition that the energy of the adjusted image signal $f_1(x, y)$ is equivalent to the energy of the original image signal $I(x, y)$.

More specifically, under the condition that a limited signal has the same energy in either time domain and space domain according to the Rayleigh's theorem, calculate the energy ratio $$\frac{E_{h\Theta I}}{E_I}$$

of the band-pass image signal $h(x, y) \otimes I(x, y)$ and the image signal $I(x, y)$, wherein $$\frac{E_{h\Theta I}}{E_I} = \frac{1}{4\pi\sigma_1^2} - \frac{2}{2\pi(\sigma_1^2 + \sigma_2^2)} + \frac{1}{4\pi\sigma_2^2},$$

$\sigma_1$ and $\sigma_2$ represent respectively the standard deviations of the low pass filter signal $h_1(x, y)$ of the first low pass filter 38 and the low pass filter signal $h_2(x, y)$ of the second low pass filter 40, and $\sigma_1$ is not equivalent to $\sigma_2$ so that $$\frac{E_{h\Theta I}}{E_I}$$

will not be zero and the band-pass filter signal $h(x, y)$ can capture the high frequency portion of the image 36. Then obtain $$C_1 = 1 - C_2 \frac{E_{h \otimes I}}{E_I}$$

on the bases that $E_f = C_1 E_I + C_2 E_{h \otimes I}$.

Subsequently, while determining the image adjustment parameter $C_2$ and the weighting coefficient $C_1$ of the image signal in Step 104 and Step 106, a maximum image distortion ratio must first be determined, that is the maximum acceptable energy decay of the unprocessed low frequency portion such as the image area 20 in FIG. 2. For instance, if the energy decay of the image area of the image 36 is to be limited to 5%, the minimum weighting coefficient of the image signal can be determined as $C_1|_{min} = 1 - 0.05 = 0.95$ and the maximum image adjustment weighting coefficient can be determined as $$C_2|_{max} = \frac{0.05}{\frac{E_{h\Theta I}}{E_I}}.$$

For the user's convenience, it is possible to provide the image adjustment normalized value between 0 and 1 normalized from the image adjustment parameter $C_2$ by the input device 44 of the image processing system 30 so that the image adjustment parameter $C_2$ can be obtained by multiplying the maximum image adjustment weighting coefficient $C_2|_{max}$ with the image adjustment normalized value. That is, when a user inputs 1 as the normalized value by the input device 44, the image adjustment parameter $C_2$ is $$\frac{0.05}{E_{h\odot l}/E_l},$$

the weighting coefficient $C_1$ of the image signal is 0.95, and the adjusted energy amplitude will be 5% in maximum. Alternatively, when the user inputs 0 as a corresponding weighting coefficient by the input device 44, the image adjustment parameter $C_2$ is 0, the weighting coefficient $C_1$ of the image signal is 1, and the adjusted energy amplitude will be 0% in minimum, which means not to adjust the image 36.

Consequently evaluate the third low pass filter 41 $h_3(x, y)$ using the first filter 38, the second filter 40, the above-mentioned $C_1$ and $C_2$, and the equation $h_3(x, y)=C_1\delta(x, y)+C_2[h_1(x, y)-h_2(x, y)]$, wherein $\delta(x, y)$ is a unit pulse signal. Convolute the third low pass filter 41 and the image signal to obtain the adjusted image signal $f_1(x, y)=h_3(x, y) \otimes I(x, y)$. In such a way the luminance change in the prior art can be improved.

Figure 6:
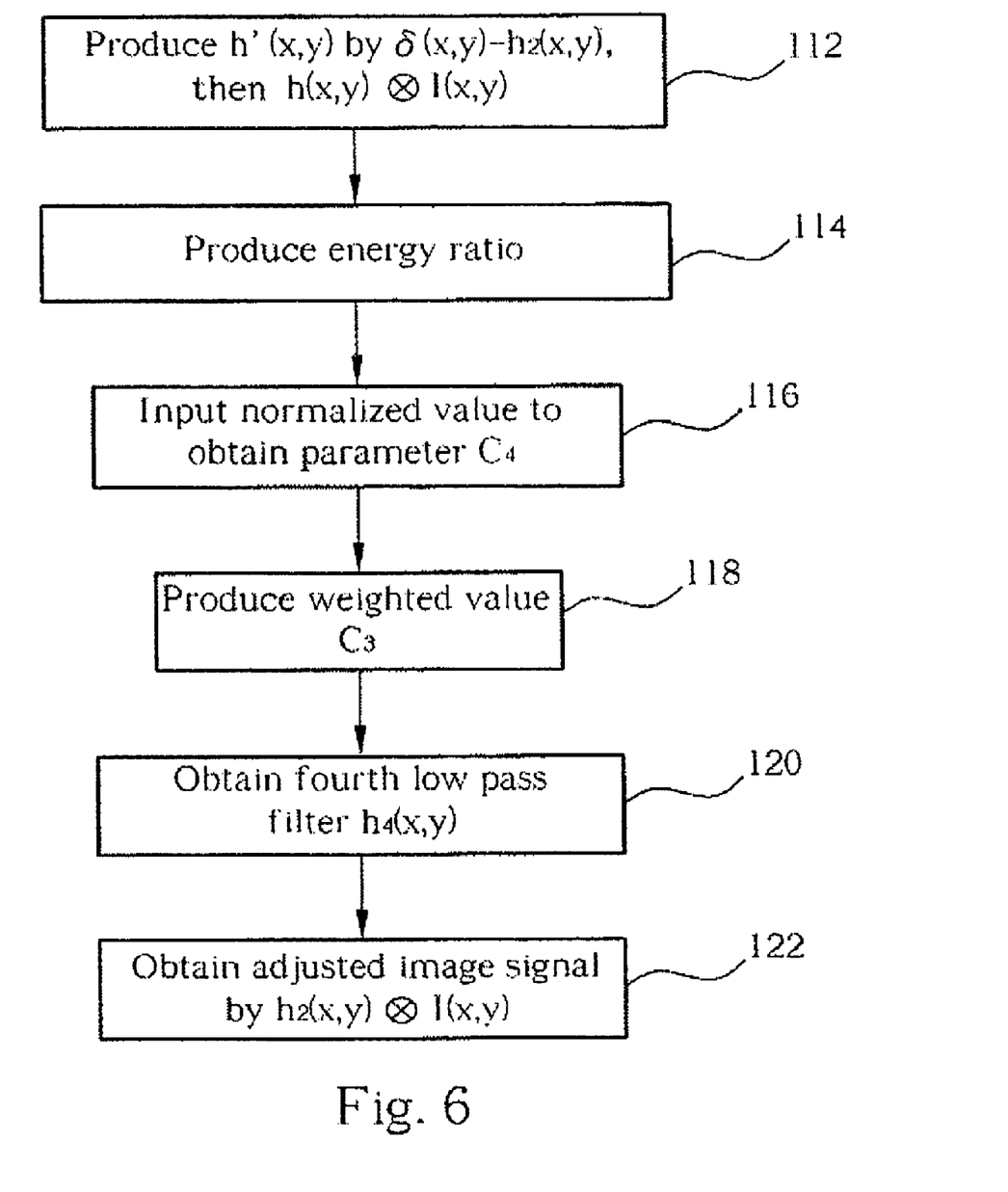
FIG. 6 illustrates a flowchart for image processing by an image processing system according to the second embodiment of the present invention.
Figure 7:
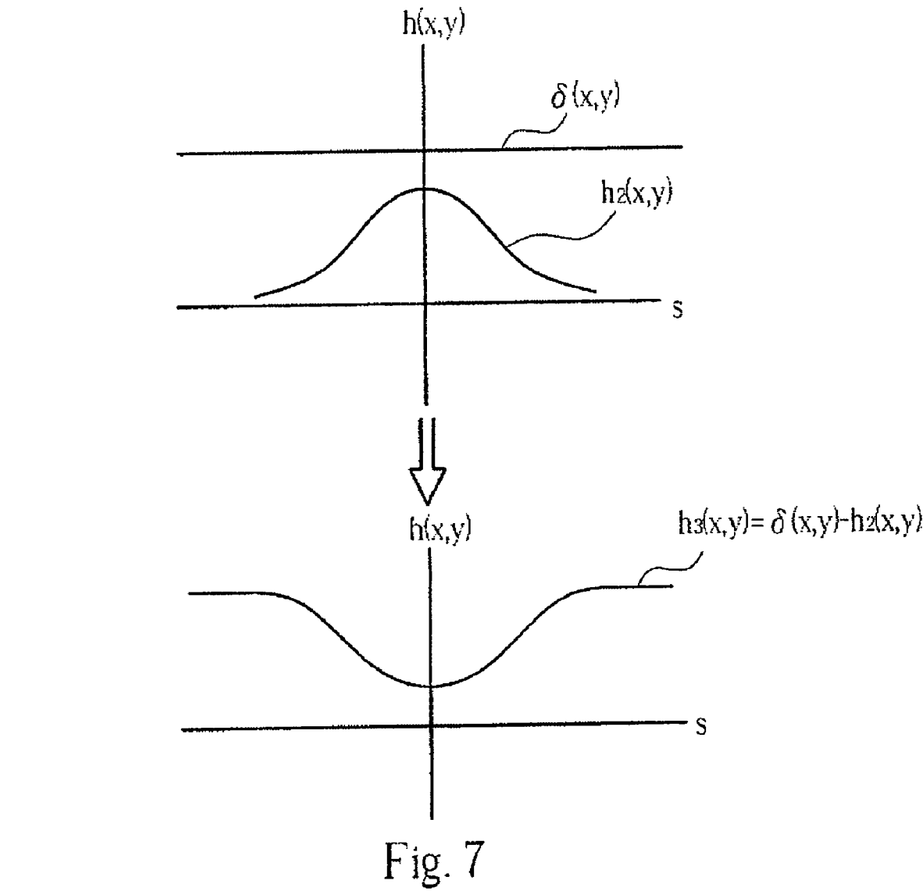
FIG. 7 illustrates a subtraction between the unit pulse signal $\delta(x, y)$ and a low pass filter signal $h_2(x, y)$ of the second low pass filter in frequency domain.

Please refer to FIG. 6 showing a flowchart for image processing by an image processing system 30 according to the second embodiment of the present invention. The difference between the two embodiments is that in the second embodiment, to simplify the calculation, a second low pass filter 40 and a unit pulse signal are used instead of the first low pass filter 38. However, when inputting an image adjustment value, the second embodiment will not show a linear transition as in the first embodiment. The flowchart in FIG. 6 includes following steps:

Step 112: Please refer to FIG. 7 showing a subtraction between the unit pulse signal $\delta(x, y)$ and a low pass filter signal $h_2(x, y)$ of the second low pass filter 40 in frequency domain. Determine a high pass filter signal $h'(x, y)$ obtained by subtracting the low pass filter signal $h_2(x, y)$ of the second low pass filter 40 from the low pass filter signal $h_1(x, y)$ of the first low pass filter 38. Define the signal resulted by convoluting $h'(x, y)$ and an image signal $I(x, y)$ as a high pass image signal $h'(x, y) \otimes I(x, y)$.

Step 114: Generate an energy ratio $$\frac{E_{h\odot l}}{E_l}$$

of the high pass image signal and the image signal according to the standard deviation of the low pass filter signal $h_2(x, y)$ of the second low pass filter 40. The energy ratio $$\frac{E_{h\odot l}}{E_l}$$

of the high pass image signal $h'(x, y) \otimes I(x, y)$ and the image signal $I(x, y)$ is equivalent to $$1 - \frac{3}{4\pi\sigma_2^2},$$

wherein $\sigma_2$ is larger than $$\sqrt{\frac{3}{4\pi}}.$$

Step 116: Provide a maximum image distortion ratio and divide it with the energy ratio $$\frac{E_{h\odot l}}{E_l}$$

to obtain a maximum image adjustment weighting coefficient $C_4|_{max}$. Further provide an image adjustment normalized value between 0 and 1 so that an image adjustment parameter $C_4$ can be obtained by multiplying the maximum image adjustment weighting coefficient $C_4|_{max}$ with the image adjustment normalized value. A user can input the image adjustment normalized value using an input device 44 of the image processing system 30 to obtain the image adjustment parameter $C_4$.

Step 118: Generate a weighting coefficient $C_3$ of the image signal according to the energy ratio $$\frac{E_{h\odot l}}{E_l}$$

and the image adjustment parameter $C_4$, wherein $$C_3 = 1 - C_4 \frac{E_{h\odot l}}{E_l}.$$

Step 120: Obtain a fourth low pass filter 46, $h_4(x, y)$ according to the weighting coefficient $C_3$ of the image signal, the image adjustment parameter $C_4$, and the low pass filter signal $h_2(x, y)$ of the second low pass filter 40, wherein $h_4(x, y)=C_3\delta(x, y)+C_4[\delta(x, y)-h_2(x, y)]$ and $\delta(x, y)$ is the unit pulse signal.

Step 122: Convolute the third low pass filter 46 $h_4(x, y)$ and the image signal $I(x, y)$ to obtain an adjusted image signal $f_2(x, y)=h_4(x, y) \otimes I(x, y)$.

The image processing method according to the second embodiment is essentially the same to that of the first embodiment. The method is to capture the high frequency portion of the image 36 and apply a convolution operation, i.e.

$$C_4[h'(x, y) \otimes I(x, y)],$$

then add the weighting coefficient of the original signal, i.e. $C_3 I(x, y)$, so that the high frequency portion is emphasized. Additionally, impose a restriction according to the conservation of energy, i.e. $(E_{f_2}=C_3 E_I + C_4 E_{h\odot I})^{\wedge}(E_{f_2}=E_I)$, and calculate an adjusted image signal $f_2(x, y)$ under the condition that the energy of the adjusted image signal $f_2(x, y)$ is equivalent to the energy of the original image signal $I(x, y)$.

In the same manner, under the condition that a limited energy signal has the same energy in either time domain or space domain according to the Rayleigh's theorem, calculate the energy ratio $$\frac{E_{h \otimes I}}{E_I}$$

of the high pass image signal $h'(x, y) \otimes I(x, y)$ and the image signal $I(x, y)$, wherein $$\frac{E_{h \otimes I}}{E_I} = 1 - \frac{3}{4\pi\sigma_2^2},$$

and $\sigma_2$ is larger than $$\sqrt{\frac{3}{4\pi}}$$

so that $$\frac{E_{R \otimes I}}{E_I}$$

will be larger than zero, in other words, the band-pass filter signal $h'(x, y) \otimes I(x, y)$ is able to capture the high frequency portion of the image 36. Since the flowchart of the second embodiment is similar to that of the first embodiment, further description is hereby omitted.

In contrast to the prior art, the present invention is capable of sharpening the edge of an image while maintaining the luminance, so that the disadvantage of the prior art which makes the image lighter due to the increased high frequency portion can be improved. Additionally, in contrast to the operation intensive calculations caused by twice adjustments on image signals required by the prior art, the method according to the present invention only calculates weighted parameters and filter signals in space domain first. In such a manner the operations are reduced and, accordingly, the cost and time of image processing is reduced at the same time.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method for adjusting an image signal by a processor comprising:
   (a) providing a first low pass filter and a second low pass filter;
   (b) generating an energy ratio of a band-pass image signal and the image signal according to the standard deviation of a first low pass signal of the first low pass filter and a second low pass signal of the second low pass filter;
   (c) providing an image adjustment parameter and generating a weighting coefficient of the image signal according to the energy ratio and the image adjustment parameter;
   (d) generating a third low pass filter according to the weighting coefficient of the image signal, the image adjustment parameter, the first low pass signal of the first low pass filter, and the second low pass signal of the second low pass filter;
   (e) adjusting the image signal according to the image signal and the third low pass filter; and
   (f) storing the adjusted image signal in a computer-readable memory.

2. The method of claim 1 wherein in step (b), the band-pass image signal is generated by convoluting the image signal and a band-pass filter signal generated by subtracting the second low pass signal of the second low pass filter from the first low pass signal of the first low pass filter.

3. The method of claim 1 wherein in step (b), the band-pass image signal is generated by convoluting the image signal and the first low pass signal of the first low pass filter to generate a first signal, and convoluting the image signal and the second low pass signal of the second low pass filter to generate a second signal, and then subtracting the second signal from the first signal.

4. The method of claim 1 wherein in step (b), the standard deviation of the first low pass signal of the first low pass filter is not equivalent to the standard deviation of the second low pass signal of the second low pass filter.

5. The method of claim 4 wherein in step (b), the energy ratio of the band-pass image signal and the image signal is $$\frac{1}{4\pi\sigma_1^2} - \frac{2}{2\pi(\sigma_1^2 + \sigma_2^2)} + \frac{1}{4\pi\sigma_2^2},$$

wherein $\sigma_1$ is the standard deviation of the first low pass signal of the first low pass filter, and $\sigma_2$ is the standard deviation of the second low pass signal of the second low pass filter.

6. The method of claim 1 wherein in step (c), the weighting coefficient of the image signal is 1-(the image adjustment parameter)*(the energy ratio of the band-pass image signal and the image signal).

7. The method of claim 1 further comprising setting the range of the image adjustment parameter according to an acceptable range of the weighting coefficient of the image signal and the energy ratio of the band-pass image signal and the image signal.

8. The method of claim 1 wherein step (d) further comprises generating a third low pass filter by multiplying the weighting coefficient of the image signal with a unit pulse signal $\delta(x, y)$ plus the product of multiplying the image adjustment parameter with the remainder obtained by subtracting the second low pass signal of the second low pass filter from the first low pass signal of the first low pass filter.

9. The method of claim 1 wherein step (e) further comprises obtaining an adjusted image signal by multiplying the image signal with the third low pass filter.

10. An image processing system for implementing the method of claim 1.

11. A method for adjusting an image signal by a processor comprising:
   (a) providing a first low pass filter and a unit pulse signal;

(b) generating an energy ratio of a band-pass image signal and the image signal according to the standard deviation of a first low pass signal of the first low pass filter;

(c) providing an image adjustment parameter and generating a weighting coefficient of the image signal according to the energy ratio and the image adjustment parameter;

(d) generating a third low pass filter according to the image signal, the image adjustment parameter, the first low pass signal of the first low pass filter, and the unit pulse signal;

(e) adjusting the image signal according to the image signal and the third low pass filter; and (f) storing the adjusted image signal in a computer-readable memory.

12. The method of claim 11 wherein in step (b), the band-pass image signal is generated by convoluting the image signal and a band-pass filter signal generated by subtracting the first low pass signal of the first low pass filter from the unit pulse signal.

13. The method of claim 11 wherein in step (b), the band-pass image signal is generated by convoluting the image signal and the unit pulse signal to generate a first signal, convoluting the image signal and the first low pass signal of the first low pass filter to generate a second signal, and then subtracting the second signal from the first signal.

14. The method of claim 11 wherein in step (b), the standard deviation of the first low pass signal of the first low pass filter is larger than $$\sqrt{\frac{3}{4\pi}}.$$

15. The method of claim 14 wherein in step (b), the energy ratio of the band-pass image signal and the image signal is $$1 - \frac{3}{4\pi\sigma_1^2},$$

wherein $\sigma_1$ is the standard deviation of the low pass signal of the first low pass filter.

16. The method of claim 11 wherein in step (c), the weighting coefficient of the image signal is 1-(the image adjustment parameter)*(the energy ratio of the band-pass image signal and the image signal).

17. The method of claim 11 further comprising setting the range of the image adjustment parameter according to an acceptable range of the weighting coefficient of the image signal and the energy ratio of the band-pass image signal and the image signal.

18. The method of claim 11 wherein step (d) further comprises generating a third low pass filter by multiplying the weighting coefficient of the image signal with a unit pulse signal δ(x, y) plus the product of multiplying the image adjustment parameter with the remainder obtained by subtracting the first low pass signal of the first low pass filter from the unit pulse signal.

19. The method of claim 11 wherein step (e) further comprises obtaining an adjusted image signal by multiplying the image signal with the third low pass filter.

20. An image processing system for implementing the method of claim 11.

* * * * *